United States Patent
Pham et al.

(10) Patent No.: US 8,744,013 B2
(45) Date of Patent: Jun. 3, 2014

(54) CHANNEL ESTIMATION FOR OFDM SYSTEMS

(75) Inventors: Duong Pham, Victoria (AU); Filip Zalio, Victoria (AU)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 13/516,694

(22) PCT Filed: Jan. 7, 2011

(86) PCT No.: PCT/JP2011/050605
§ 371 (c)(1),
(2), (4) Date: Aug. 22, 2012

(87) PCT Pub. No.: WO2011/083876
PCT Pub. Date: Jul. 14, 2011

(65) Prior Publication Data
US 2012/0320961 A1    Dec. 20, 2012

(30) Foreign Application Priority Data
Jan. 7, 2010    (AU) ............................... 2010900055

(51) Int. Cl.
*H03K 9/00*    (2006.01)
(52) U.S. Cl.
USPC ............ 375/316; 341/180; 370/464; 375/260
(58) Field of Classification Search
None
See application file for complete search history.

(56) References Cited

U.S. PATENT DOCUMENTS

| 2008/0186841 A1* | 8/2008 | Fung et al. ............... 370/203 |
| 2009/0262844 A1 | 10/2009 | Honta |
| 2011/0129009 A1* | 6/2011 | Doan et al. ............... 375/227 |

FOREIGN PATENT DOCUMENTS

| JP | 2003-298547 A | 10/2003 |
| JP | 2009-260604 A | 11/2009 |

OTHER PUBLICATIONS

International Search Report PCT/JP2011/05060 dated Feb. 22, 2011 (English Translation Thereof).
Mitsuru Nakamura, et al., "New estimation and Equalization approach for OFDM under Doppler-spread channel," Proceedings of the 13$^{th}$ IEEE International Symposium on Personal, Indoor and Mobile Radio Communications, 2002.,Sep. 15, 2002, vol. 2, pp. 555-560.
Mingying Lan, et al."A LMMSE Channel Estimator for Coherent Optical OFDM System," Proceedings of the 2009 Asia Communications and Photonics Conference and Exhibiton (ACP), Nov. 2, 2009, pp. 1-6.
Sunkyung Shin, et al., "Performace Analysis of MD-OFDM System using SVD aimed LMMSE Channel Estimation," Proceedings of the IEEE International Conference on Ultra-Wideband, 2007. ICUWB 2007, Sep. 24, 2007, pp. 840-844.

(Continued)

*Primary Examiner* — Adolf Dsouza
(74) *Attorney, Agent, or Firm* — McGinn IP Law Group, PLLC

(57) ABSTRACT

A device for performing channel estimation in an OFDM system includes a non-volatile memory, a G matrix selector and a channel estimate generator. The non-volatile memory stores a set of G matrices indexed by signal to noise ratio, the G matrices being precalculated for a plurality of signal to noise ratios using a fixed Doppler frequency and a fixed delay spread. The G matrix selector uses a quantised signal to noise ratio to select a G matrix from the set of G matrices stored in the non-volatile memory. The channel estimate generator multiplies the selected G matrix by LS estimates for the reference signal to obtain a channel estimation.

8 Claims, 3 Drawing Sheets

(56) References Cited

OTHER PUBLICATIONS

Rocco Claudio Cannizzaro, et al., "Adaptive Channel Estimation for OFDM Systems with Doppler Spread", Proceedings of the IEEE 7th Workshop on Signal Processing Advances in Wireless Communications, 2006. SPAWC '06, Jul. 2, 2006, pp. 1-5.
European Search Report dated Mar. 31, 2014.
Farzad Foroughi et al: "Channel estimation for a mobile terminal in a multi-standard environment (LTE and DVB-H)", Signal Processing and Communication Systems, 2009. ICSPCS 2009. 3rd International Conference on, IEEE, Piscataway, NJ, USA, Sep. 28, 2009, pp. 1-9, XP031557888, ISBN: 978-1-4244-4473-1.
Mehmet Kemal Ozdemir et al: "Channel estimation for wireless ofdm systems", IEEE Communications Surveys, IEEE, New York, NY, US, vol. 9, No. 2, Apr. 1, 2007, pp. 18-48, XP011381247, ISSN: 1553-877X, DOI: 10.1109/COMST.2007.382406.
Sill Lu et al: "Coherent and Differential ICI Cancellation for Mobile OFDM with Application to DVB-H", IEEE Transactions on Wireless Communications, IEEE Service Center, Piscataway, NJ, US, vol. 7, No. 11, Nov. 1, 2008, pp. 4110-4116, XP011238610, ISSN: 1536-1276, DOI: 10.1109/T-WC.2008.070591.

* cited by examiner

Fig.4

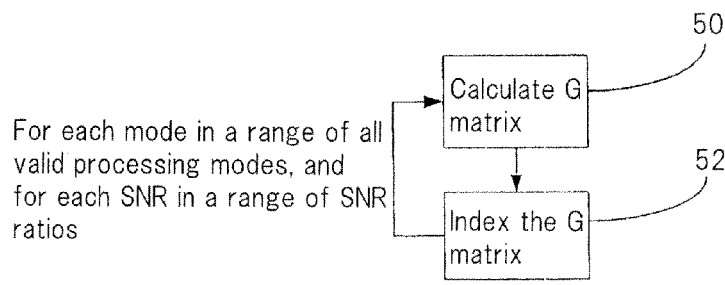

Fig.5

```
                    ┌─────────────────┐ 58
                    │ Quantise SNR    │
                    │ (and determine  │
                    │ processing      │
                    │ mode)           │
                    └────────┬────────┘
                             │         60
                    ┌────────▼────────┐
                    │ Select G matrix │
                    └────────┬────────┘
   66                        │
   ┌──────────────┐          │         62
   │ Split LS     │ ┌────────▼────────┐
   │ estimates    │─▶│ Multiply G matrix│
   │ into streams │  │ by LS estimates │
   └──────────────┘  └────────┬────────┘
                              │        64
                    ┌─────────▼────────┐
                    │ Obtain channel   │
                    │ estimation       │
                    └──────────────────┘
```

CHANNEL ESTIMATION FOR OFDM SYSTEMS

TECHNICAL FIELD

The present invention relates generally to orthogonal frequency division modulation (OFDM) communication systems, and in particular to improvements in channel estimation for an OFDM system.

BACKGROUND

OFDM is a digital multi-carrier modulation method that uses a large number of closely spaced orthogonal sub-carriers to carry data. OFDM is becoming widely applied in wireless communication systems due to the high rate transmission capability with high bandwidth efficiency. Signals received from OFDM transmitting antennas may be subject to channel fading due to multipath propagation or interference between the signals and geographical surroundings. To take account of this, reference signals are mapped onto subcarriers and used at the receiver to obtain channel estimations.

FIG. 1 shows a user equipment (UE) receiver 8 for an OFDM system, which transforms a received radio frequency signal into soft bits representing data. An analog front end 10 amplifies and converts the radio frequency signal, received at multiple receive antennas, from the radio channel frequency to an analog base band signal centered around zero Hz. Multiple antennas are used to achieve receive diversity. This is a 3GPP standard requirement for UE receivers.

A set of analog to digital converters 12 convert the analog baseband signal to a stream of digital samples, with a sampling frequency of 30.72 MHz (a typical example for the 3GPP LTE standard). All subsequent processing after this point is performed in the digital discrete domain. A path searcher and timing tracking block 14 determines the regular points in time where the FFT block 16 starts buffering each set of samples and performs a Fourier transform on them. Processing with the FFT block 16 is a technique required within the LTE and LTE-A standards, as these are both using the OFDM waveform.

The channel estimator 18 provides a set of complex samples, for each OFDM symbol and for each subcarrier, so that the received signal can then be demodulated and converted to soft bits by a demodulator 20. In this example, the demodulator 20 is for a data channel e.g. the physical downlink shared channel (PDSCH). The soft bits that are output from the demodulator 20 are then output to the HARQ and Turbo decoder, which is not shown in FIG. 1. The channel estimator 18 also provides the estimates for a control channel e.g. the physical downlink control channel (PDCCH).

One method of channel estimation is the 2D Linear Minimum Means Square Error (2D LMMSE). In this method, the channel estimator 18 multiples a G matrix by least squares (LS) channel estimates as will be described below.

FIG. 2 shows an example block of OFDM resource elements. The resource element (RE) of frequency time index $(k_i, l_i)$ is indexed i with:

$$i = l_i \times K + k_i$$

$$i \in \Omega = [0, 1, \ldots, L \times K - 1]$$

$$k_i \in [0, 1, \ldots, K-1]$$

$$l_i \in [0, 1, \ldots, L-1] \quad \text{Equation 1-1}$$

The indexing method $i = k_i \times L + l_i$ is also possible and has the same results as the method above ($i = l_i \times K + k_i$).

The time frequency correlation between the channels of a transmission link between a transmit point (antenna) and a receive point (antenna) at the m-th RE, $h_m$, and at the n-th RE, $h_n$, is as follows:

$$E\{h_m h_n^*\} = r_f(k_m - k_n) r_t(l_m - l_n), \quad m \in \Omega, n \in \Omega. \quad \text{Equation 1-2}$$

For an exponential power delay profile, the frequency domain correlation between two sub-carriers $k_m$ and $k_n$ is given by:

$$r_f(k_m - k_n) = \frac{1}{1 + j2\pi \tau_{rms}(k_m - k_n)\Delta f} \quad \text{Equation 1-3}$$

where $\Delta f$ is the sub-carrier spacing, and $\tau_{rms}$ is r.m.s delay spread of the channel. The r.m.s delay spread can be expressed as:

$$\tau_{rms} = \sqrt{\left(\frac{\sum_k P_k \tau_k^2}{\sum_k P_k} - \left(\frac{\sum_k P_k \tau_k}{\sum_k P_k}\right)^2\right)} \quad \text{Equation 1-4}$$

where $P_k$ and $\tau_k$ denote the k-th path power and delay respectively.

The time domain correlation between two OFDM symbols $l_m$ and $l_n$ is given by $$r_t(l_m - l_n) = J_0(2\pi T_u f_D (l_m - l_n)) \quad \text{Equation 1-5}$$

where $J_0$, is the zeroth order Bessel function of the first kind, $T_u$ is the OFDM symbol length, and $f_D$ is the maximum Doppler frequency given by $$f_D = \frac{\upsilon \times f_c}{C} \quad \text{Equation 1-6}$$

where $\upsilon$ is the mobile speed, $f_c$ is the carrier frequency, and the C is the speed of the light. The zeroth order Bessel function $J_0$ is given by $$J_0(x) = \frac{1}{\pi} \int_0^\pi \cos(x \sin\theta) d\theta. \quad \text{Equation 1-7}$$

The zeroth order Bessel function $J_0$ can also be expressed as $$J_0(x) = \sum_{v=0}^{\infty} \frac{\left(\frac{-x^2}{4}\right)^v}{(v!)^2} \quad \text{Equation 1-8}$$

where $v! = v(v-1)(v-2) \ldots 1$. Although $J_0$ is a summation of infinite terms, it can be approximated by finite terms.

Given the received signals $y_{p_n}$ of the reference signals $s_{p_n}$ at the RE indices $p_n$ of a transmission link between a transmit point (antenna) and a receive point (antenna)

$$y_{p_n} = h_{p_n} \times s_{p_n} + n_{p_n}$$

$$n = 0, 1, \ldots, N_{ref} - 1, [p_0, p_1, \ldots, p_{N_{ref}-1}] \subset \Omega$$

where $N_{ref}$ is the number of reference symbols within estimated region.

The channel estimator 18 finds the channels at all resource elements (REs), $\hat{h}=[\hat{h}_0, \hat{h}_1, \ldots, \hat{h}_{LK-1}]^T$ of the transmission link as follows:

$$\hat{h} = A \times \underbrace{\left[B + \frac{1}{SNR}I\right]^{-1}}_{G} \times z \qquad \text{Equation 2-1}$$

Here:

z contains the least squared channel estimates for reference REs:

$$z_n = y_{p_n}/s_{p_n}, n=0,1,\ldots,N_{ref}-1. \qquad \text{Equation 2-2}$$

A is the correlation matrix between the channels at all REs and the channels at the reference REs; the size of A is LK by $N_{ref}$. The (m,n)-th element of A is given by:

$$A_{m,n}=E\{h_m h_{p_n}^*\}=r_f(k_m-k_{p_n})r_t(l_m-l_{p_n}), m=0,1,\ldots, LK-1, n=0,1,\ldots,N_{ref}-1. \qquad \text{Equation 2-3}$$

B is the correlation matrix between the channels at the reference REs; the size of B is $N_{ref}$ by $N_{ref}$. The (m,n)-th element of B is given by:

$$B_{m,n}=E\{h_{p_m} h_{p_n}^*\}=r_f(k_{p_m}-k_{p_n})r_t(l_{p_m}-l_{p_n}), m=0,1,\ldots, N_{ref}-1, n=0,1,\ldots,N_{ref}-1. \qquad \text{Equation 2-4}$$

Equation 2-1 shows how the channel estimator 18 calculates the G matrix from the component matrices A and B. Since large matrix inversion is required, this operation is computationally intensive. The calculation of the Bessel function for each element of the matrices is also computationally intensive. Another computationally intensive operation is the multiplication of the G matrix by the LS estimates within Equation 2-1, ie the G×z term. This step needs to be performed at high speed, for each newly received block of input data, ie for each slot (or alternatively: each subframe) in case of LTE and LTE-A UE or base transceiver station (BTS).

Also, the G matrix needs to be updated any time one of the input parameters changes. These parameters include r.m.s delay spread estimate $\tau_{rms}$, Maximum Doppler frequency estimate $f_D$, Signal To Noise Ratio and Reference Signal configuration, ie the positions of the Reference Signal within the estimated region.

These complexities limit the use of 2D LMMSE channel estimation in commercial products.

It would be desirable to provide a method and/or device for channel estimation that is more feasible to use within a commercial product and ameliorates one or more of the complexities of known channel estimation methods.

The above discussion of background art is included to explain the context of the present invention. It is not to be taken as an admission or a suggestion that any of the documents or other material referred to was published, known or part of the common general knowledge at the priority date of any one of the claims of this specification.

DISCLOSURE OF THE INVENTION

According to one aspect, the present invention provides a method for channel estimation in an OFDM system, including the steps of: quantising a signal to noise ratio of a received reference signal, using the quantised signal to noise ratio to select a G matrix from a set of G matrices indexed by signal to noise ratio, the G matrices being precalculated for a plurality of signal to noise ratios using a fixed Doppler frequency and a fixed delay spread, and multiplying the selected G matrix by least squares (LS) estimates for the reference signal in order to obtain a channel estimation.

The method reduces the complexity of the channel estimator because Doppler spread and delay spread values do not need to be estimated and updated at the time of performing the channel estimation. Instead, for each signal to noise ratio a single matrix G is precalculated that covers all range of realistic values for Doppler frequency and delay spread. This increases robustness (against channel conditions) and reduces complexity of the channel estimator. The Doppler frequency and delay spread values may be chosen and fixed so that the estimation is robust to different channels within the normal test conditions for e.g. a LTE/LTE-A UE.

A channel estimator using the method is robust to time variation and frequency selectivity of the channel. G matrix calculation is not required to be performed dynamically, simplifying the process. As the SNR is quantised, only a limited set of G matrices needs to be stored, further reducing complexity. The method may be used to provide channel estimation for both data and control channels.

The invention is applicable to the Long Term Evolution (LTE) and LTE-Advanced (LTE-A) standards. However, the invention is not limited to these standards and may also be used in other OFDM systems. Various embodiments may be applied either in the downlink receiver in the user equipment (UE) or uplink receiver in the base transceiver station (BTS).

The set of G matrices may be precalculated for a range of processing modes and indexed in the set by processing mode as well as signal to noise ratio. In this case, the method may further include the step of: determining the processing mode of the received reference signal, and using the processing mode as well as the quantised signal to noise ratio to select the G matrix.

The processing mode may be based on one or more of the following parameters:

FDD vs TDD;

Cell-specific reference signal vs UE-specific reference signals;

Normal cyclic prefix vs extended cyclic prefix;

Subframe type;

Size of the channel estimation region in the time domain; and

Size of channel estimation region in the frequency domain.

A set of G matrices for each valid combination of these modes may be stored and used to perform the channel estimation. This allows a single channel estimator to be used for different processing modes, for example by reconfiguring control parameter registers. The different processing modes define different positions of the reference signals, and these positions are taken into account in the G matrix. For example, the method may be applicable to different reference signal configurations within the 3GPP LTE standard, for reception of the data channel:

LTE-FDD Cell-specific Reference Signals

LTE-FDD UE-specific Reference Signal

LTE-TDD Cell-specific Reference Signals

LTE-TDD UE-specific Reference Signal

The inventors have found that the channel estimation error is not sensitive to choice of the G matrix, if:

The r.m.s delay spread used for calculating the G matrix is greater than the r.m.s delay spread of the actual channel.

The Doppler frequency used for calculating the G matrix is greater than the Doppler frequency spread of the actual channel while the channel Doppler frequency spread is not greater than 300 Hz. The standard test conditions for LTE and LTE-A user equipment only use Doppler spreads below 300 Hz.

The Signal to Noise Ratio used for selecting the G matrix is less than 3 dB different from the true SNR of the channel.

Due to these findings, it is possible to pre-calculate a set of G matrices for different quantized Signal-to-Noise Ratio values within the normal operating range of the device. This is one dimension in a lookup table which stores the G matrices. So, the G matrix calculation is not required within the device, thus simplifying the complexity.

In one embodiment of the invention, intended for LTE and LTE-A UE, the fixed Doppler frequency is 300 Hz, the fixed delay spread is $991 \times 10^{-9}$ and the signal to noise ratio is quantised to 3 dB steps.

The quantisation of the signal to noise ratio may be fairly coarse, such as the 3 dB steps used in the LTE/LTE-A UE, to minimise the number of G matrices that need to be stored. The quantisation may be selected to ensure that the performance of the channel estimation is sufficient.

The method may further include the step of: splitting the LS estimates into streams corresponding to sub-sections of the entire bandwidth of the reference signal, wherein the step of multiplying the selected G matrix by LS estimates for the reference signal involves multiplying the selected G matrix by the LS estimate stream for each bandwidth sub-section to obtain a set of channel estimations.

Performing the channel estimation separately on sub-sections of the entire bandwidth provides simplicity and good performance to the method. The choice of reference signals in time domain is limited. Limiting the channel estimation size in both time domain and frequency domain reduces the complexity and allows the channel estimation to be parallelized, for each of the bandwidth subsections.

The size of the sub-sections may be chosen during device design stage so that the performance of the channel estimation is sufficient for the receiver to meet performance requirements, for example, of the LTE standard. Advantageously, all sub-sections may be identical in terms of size and positions of the reference signals so all sub-sections may share a single identical G matrix. This approach allows parallelization of the computation, and allows the channel estimator to meet its timing requirements by minimizing the actual processing time.

According to another aspect, the present invention provides a method of providing a set of G matrices for use in channel estimation in an OFDM system, including the steps of: for a range of discrete signal to noise ratios: precalculating a G matrix using a fixed Doppler frequency and a fixed delay spread, and indexing the G matrices by the signal to noise ratio.

As described above, providing a set of precalculated G matrices avoids the need to perform resource consuming calculations when performing the channel estimation. Again, the G matrices for one embodiment—a LTE/LTE-A UE, may be calculated with the fixed Doppler frequency of 300 Hz and the fixed delay spread of $991 \times 10^{-9}$. The signal to noise ratios in the range of discrete signal to noise ratios may be separated by e.g. 3 dB.

The step of precalculating the G matrices for a range of discrete signal to noise ratios may be performed for a range of processing modes, and the method may further include the step of: indexing the set of G matrices by processing mode as well as signal to noise ratio. The processing modes may be based on the parameters described above.

According to a further aspect, the present invention provides a device for performing channel estimation in an OFDM system, the device including: a non-volatile memory for storing a set of G matrices indexed by signal to noise ratio, the set of G matrices being precalculated for a plurality of signal to noise ratios using a fixed Doppler frequency and a fixed delay spread, a G matrix selector using a quantised signal to noise ratio to select a G matrix from the set of G matrices stored in the non-volatile memory, and a channel estimate generator for multiplying the selected G matrix by LS estimates for the reference signal to obtain a channel estimation.

The G matrices stored in the non-volatile memory may be indexed by processing mode as well as signal to noise ratio and the G matrix selector may use processing mode as well as quantised signal to noise ratio to select the G matrix used to obtain the channel estimation. Different reference signal configurations require different versions of the G matrix, so in this embodiment, the processing mode is used as an index in the G matrix lookup table. The device may also include configurable reference signal demultiplexers for processing reference signals received in different processing modes. This enables the device to process different combinations of reference signal configurations, for example those applicable within the 3GPP LTE, and LTE-A standard. This simplifies the implementation because there is no need to have separate channel estimators for different cases, as in the prior art. A single channel estimator handles different channel estimation modes.

The device may further include a LS estimator for calculating the LS estimates from the reference signal. The device may then internally calculate Least Squares estimates, which are in turn used for multiple purposes. For example, in the case when the device is used within a UE, the LS estimates may be used for channel estimation for the data channel (PDSCH), channel estimation for the control channel (PDCCH) and Signal-to-Noise ratio estimation. In some prior art designs, each of these required a separate LS estimator, resulting in larger complexity.

To further simplify the implementation, the device may include a LS estimates demultiplexer for splitting the LS estimates into streams corresponding to sub-sections of the entire bandwidth of the reference signal and the channel estimate generator may multiply the selected G matrix by the LS estimate streams for each bandwidth sub-section to obtain a set of channel estimations. The multiplication of each LS estimate stream may be performed in parallel.

Embodiments of the present invention will now be described, by way of example only, with reference to the accompanying drawings. It is to be understood that the particularity of the drawings does not supersede the generality of the preceding description of the invention.

BRIEF DESCRIPTION OF THE DRAWINGS

FIG. 4 is a flowchart showing method of providing a set of G matrices for use in channel estimation according to an embodiment of the invention.

FIG. 5 is a flowchart showing a method for channel estimation according to an embodiment of the invention.

DETAILED DESCRIPTION

Figure 1:
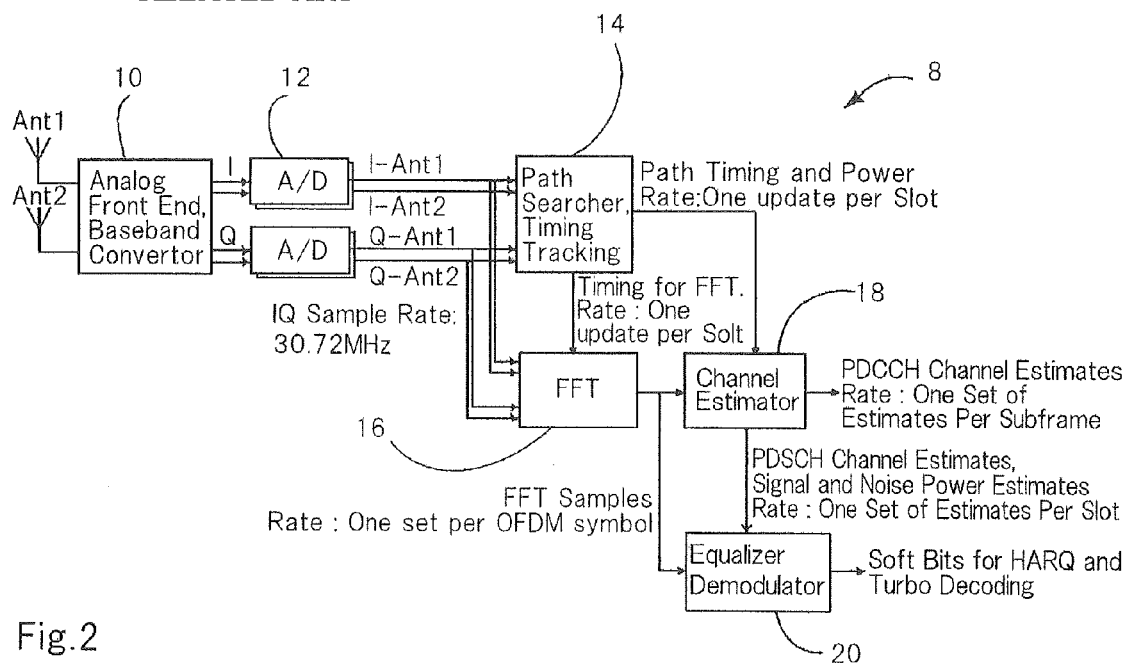
FIG. 1 is a schematic diagram depicting a prior art UE receiver for an OFDM system.
Figure 2:
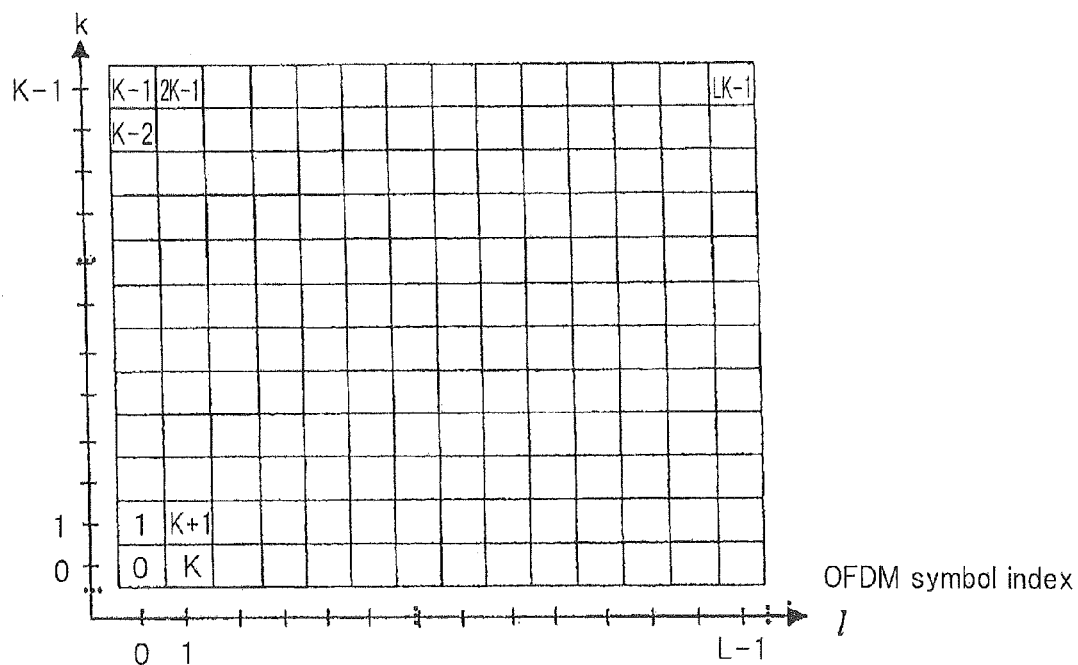
FIG. 2 is a graphical depiction of a block of OFDM resource elements received by the receiver of FIG. 1.

An embodiment of the invention will be described with reference to channel estimation in an LTE/LTE-A UE receiver 8, as shown in FIG. 1. It is understood that the invention is not limited to this embodiment and is applicable in the BTS, as well as other OFDM based systems.

With reference to FIG. 4, the following steps are performed during device design time, to build a look up table containing a set of G matrices for use in channel estimation. For each mode in a range of all valid processing modes, a G matrix is precalculated at step 50 for each SNR in a range of SNR values using a fixed Doppler frequency and a fixed delay spread. At step 52, the G matrices are indexed by the signal to noise ratio and processing mode. However, it is to be understood that the G matrices may be precalculated only for a single processing mode, and may be indexed by SNR only. A specific example of the method is described below: For a plurality of discrete signal to noise ratios (such as a range of discrete signal to noise ratios separated by 3 dB: [−6, −3, 0, 3, 6, 9, 12, 15, 18, 21, 24, 27, 30]): precalculate a G matrix using a fixed Doppler frequency and a fixed delay spread.

Specifically:

$$G = A \times \left[ B + \frac{1}{SNR} I \right]^{-1}$$

Equation 3-1

A is the correlation matrix between the channels at all REs and the channels at the reference REs; the size of A is LK by $N_{ref}$. The (m,n)-th element of A is given by:

$$A_{m,n} = \frac{1}{1 + j2\pi\tau_{rms}(k_m - k_{P_i})\Delta f} \times \sum_{v=0}^{V} \left( \frac{-(2\pi T_u f_D (I_m - I_{P_i}))^2}{4} \right)^v / (v!)^2,$$

$$m = 0, 1, \ldots, LK - 1, n = 0, 1, \ldots, N_{ref} - 1.$$

Equation 3-2

B is the correlation matrix between the channels at the reference REs; the size of B is $N_{ref}$ by $N_{ref}$. The (m,n)-th element of B is given by:

$$B_{m,n} = \frac{1}{1 + j2\pi\tau_{rms}(k_{p_m} - k_{p_n})\Delta f} \times \sum_{v=0}^{V} \left( \frac{-(2\pi T_u f_D (I_{pm} - I_{Pn}))^2}{4} \right)^v / (v!)^2,$$

$$m = 0, 1, \ldots, N_{ref} - 1, n = 0, 1, \ldots, N_{ref} - 1.$$

Equation 3-3

With the following parameters:

$\Delta f = 15000$ Hz $T_u = 7.1429 \times 10^{-5}$ $f_D = 300$ $\tau_{rms} = 991 \times 10^{-9}$ Equation 3-4

The parameter L refers to the size of the channel estimation region, in time domain. It is the number of OFDM symbols. Example values for LTE and LTE-A UE are:

In 2-slot based estimation:

$$L = \begin{cases} 14 \text{ for normal cyclic prefix } (CP) \\ 12 \text{ for extended } CP \end{cases}$$

Equation 3-5

In 1-slot based estimation:

$$L = \begin{cases} 7 \text{ for normal } CP \\ 6 \text{ for extended } CP \end{cases}$$

Equation 3-6

The parameter K is the size of the channel estimation region in frequency domain. It is the number of subcarriers per subsection.

In all of the formulas above, the parameters $k_{pn}$, $k_{pm}$, $l_{pm}$, $l_{pn}$ refer to the position of the reference signals within the channel estimation region for each of the pilots. Exact values of the positions used depend on the following channel estimation mode parameters:

FDD vs. TDD mode;
Cell-specific vs. UE-specific Reference Signal mode;
Normal vs. Extended Cyclic Prefix mode;
Subframe Type (Normal, MBSFN, Special TDD Subframe);
Size of the channel estimation region, in time domain, Number of Slots to include in the estimate; and
Size of the channel estimation region, in frequency domain.

The G matrix is precalculated for a range of processing modes based on these parameters, and indexed by processing mode as well as signal to noise ratio. In other embodiments, the G matrix may be precalculated for only a single processing mode, and may be indexed by SNR only.

Figure 3:
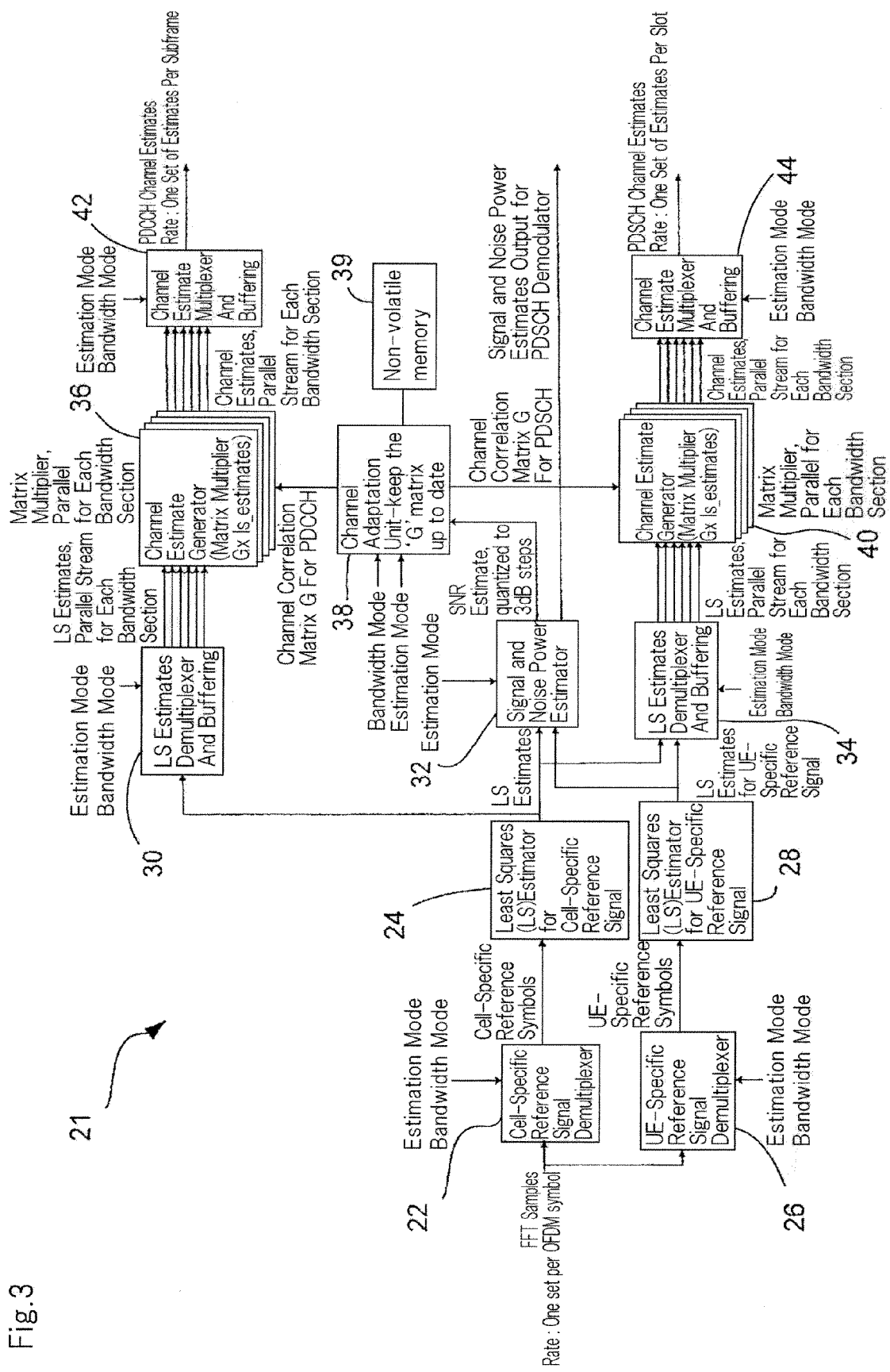
FIG. 3 is a schematic diagram of a series of data processing blocks for performing channel estimation according to an embodiment of the invention.

The lookup table of G matrices can then be stored in a non-volatile memory 39 in a channel estimator 21 according to an embodiment of the invention (see FIG. 3). The channel estimator 21 provides channel estimations for both the control channel and data channel. Estimations may be obtained for both Cell-Specific and UE-Specific reference signals. The control channel always uses the Cell-specific reference signal, while the data channel uses either Cell-Specific or UE-Specific reference signals, depending on the operation mode.

With reference to FIG. 5, a method for channel estimation according to an embodiment of the invention includes the steps of quantising a signal to noise ratio (SNR) of a received reference signal (step 58), using the quantised SNR to select a G matrix from the set of G matrices (step 60), and multiplying the selected G matrix by least squares (LS) estimates for the reference signal (step 62) in order to obtain a channel estimation (step 64). If applicable, step 58 may also include determining the processing mode of the received reference signal, and then the processing mode is used as well as the quantised signal to noise ratio to select the G matrix at step 60.

As an option, at step 66, the LS estimates may be split into streams corresponding to sub-sections of the entire bandwidth of the reference signal, and step 62 of multiplying may involve multiplying the selected G matrix by the LS estimate stream for each bandwidth sub-section to obtain a set of channel estimations at step 64.

A specific example of these steps will now be described below with reference to FIG. 3. The channel estimator 21 includes a Cell-Specific Reference Signal Demultiplexer 22 that receives samples from the FFT block 16 (FIG. 1). The samples comprise the resource elements from all subcarriers in all OFDM symbols. The Cell-Specific Reference Signal Demultiplexer 22 demultiplexes (or 'filters') this stream and outputs only the resource elements that contain the Cell-Specific reference signal. The positions of Cell-Specific Reference Signal depend on the channel estimation mode and the bandwidth mode. The reference signal demultiplexer is configurable for processing reference signals received in different processing modes.

A Cell-Specific Least Squares Estimator 24 obtains the received reference signal samples, and calculates least square (LS) estimates. The LS estimates are used to estimate the signal to noise ratio in the Signal and Noise Estimator 32. The Signal and Noise Estimator 32 uses either the LS estimates from the Cell-specific reference signal or from the UE-specific reference signal, depending on which one of these is used for the channel estimation.

The signal to noise ratio is then quantised to 3 dB steps, and used by the G matrix selector 38 as lookup address to select a G matrix from the set of G matrices previously calculated and stored in non-volatile memory 39. The G matrix selector 38 also uses the estimation (processing) mode to select the correct pre calculated G matrix. Different matrices are selected for the data channel and the control channel, because the control channel uses only the first OFDM symbol of each subframe, whereas the data channel uses all OFDM symbols containing reference signals for the estimation.

In the case of the control channel, the LS estimates de-multiplexer 30 captures the reference symbols at the start of each subframe, as the control channel uses only Cell-specific reference signals in the first OFDM symbol of each subframe.

The LS estimates de-multiplexer 30 splits the Cell-specific LS estimates into separate streams for each bandwidth section, for the purpose of performing channel estimation for the control channel. Each of the streams is then output into a channel estimate generator 36 which performs the multiplication of the LS estimates by the G matrix, for each bandwidth section. This results in a set of channel estimates, which are then reassembled into the structure required by further processing in the multiplexing and buffering block 42. The multiplexing and buffering block 42 then outputs the control channel estimates.

The data channel processing involves blocks 26, 28, 34, 40 and 44. The UE-specific reference signal de-multiplexer 26 selects the resource elements that contain the UE-specific reference signal only. These samples are then forwarded onto LS estimator for UE-specific reference signal 28.

The LS estimates de-multiplexer 34 then selects either the Cell-specific or UE-specific LS estimates, depending on the channel estimation mode.

The LS estimates de-multiplexer 34 is configured to buffer the reference symbols that are included in the channel estimation. The most likely configuration in a LTE or LTE-A UE is that the channel estimation is done for one whole subframe, at a time. In such case, the LS estimates de-multiplexer 34 will capture the LS estimates for OFDM symbols within the subframe for which the estimate is being calculated. In case of using Cell-specific reference symbols, and if it is required for performance reasons—the LS estimates de-multiplexer 34 would also buffer reference symbols from slots that immediately precede and follow the subframe for which the estimate is being performed.

Furthermore, the LS estimates de-multiplexer 34 then splits the buffered LS estimates into separate streams corresponding to sub-sections of the entire bandwidth of the reference signal. Each of the streams is then output into a channel estimate generator 40 which performs the multiplication of the LS estimates by the G matrix, for each bandwidth sub-section. The sub-sections are identical in size so that the same G matrix may be used, and the multiplications are performed in parallel. This results in a set of channel estimates, which are then reassembled into the structure required by further processing in the multiplexing and buffering block 44. The multiplexing and buffering block 44 then finally outputs the data channel estimates.

It is to be understood that various alterations, additions and/or modifications may be made to the parts previously described without departing from the ambit of the present invention, and that, in the light of the above teachings, the present invention may be implemented in software, firmware and/or hardware in a variety of manners as would be understood by the skilled person.

The present application may be used as a basis for priority in respect of one or more future applications, and the claims of any such future application may be directed to any one feature or combination of features that are described in the present application. Any such future application may include one or more of the following claims, which are given by way of example and are non-limiting with regard to what may be claimed in any future application.

The invention claimed is:

1. A method for channel estimation in an OFDM system, as including:
   quantising a signal to noise ratio of a received reference signal,
   using the quantised signal to noise ratio to select a G matrix from a set of G matrices indexed by signal to noise ratio, the G matrices being precalculated for a plurality of signal to noise ratios using a fixed Doppler frequency and a fixed delay spread,
   multiplying the selected G matrix by least squares (LS) estimates for the reference signal in order to obtain a channel estimation, and
   splitting the LS estimates into streams corresponding to sub-sections of the entire bandwidth of the reference signal,
   wherein the multiplying the selected G matrix by LS estimates for the reference signal involves multiplying the selected G matrix by the LS estimate stream for each bandwidth sub-section to obtain a set of channel estimations.

2. The method as claimed in claim 1, wherein the sub-sections are identical in size.

3. The method as claimed in claim 1, wherein the multiplication of the selected G matrix by the LS estimate streams is performed in parallel.

4. The method as claimed in claim 2, wherein the multiplication of the selected G matrix by the LS estimate streams is performed in parallel.

5. A device for performing channel estimation in an OFDM system, including:
   a non-volatile memory for storing a set of G matrices indexed by signal to noise ratio, the G matrices being precalculated for a plurality of signal to noise ratios using a fixed Doppler frequency and a fixed delay spread,
   a G matrix selector using a quantised signal to noise ratio to select a G matrix from the set of G matrices stored in the non-volatile memory,
   a channel estimate generator for multiplying the selected G matrix by LS estimates for the reference signal to obtain a channel estimation, and a LS estimates demultiplexer for splitting the LS estimates into streams corresponding to sub-sections of the entire bandwidth of the reference signal, wherein the channel estimate generator multiplies the selected G matrix by the LS estimate streams for each bandwidth sub-section to obtain a set of channel estimations.

6. The device as claimed in claim 5, wherein the channel estimate generator performs the multiplication of the selected G matrix by the LS estimate streams in parallel.

7. A device for performing channel estimation in an OFDM system, including:

a non-volatile memory for storing a set of G matrices indexed by signal to noise ratio, the G matrices being precalculated for a plurality of signal to noise ratios using a fixed Doppler frequency and a fixed delay spread, a G matrix selector using a quantised signal to noise ratio to select a G matrix from the set of G matrices stored in the non-volatile memory, a channel estimate generator for multiplying the selected G matrix by LS estimates for the reference signal to obtain a channel estimation, wherein the G matrices stored in the non-volatile memory are indexed by processing mode as well as signal to noise ratio and wherein the G matrix selector uses processing mode as well as quantised signal to noise ratio to select the G matrix used to obtain the channel estimation, and a LS estimates demultiplexer for splitting the LS estimates into streams corresponding to sub-sections of the entire bandwidth of the reference signal, wherein the channel estimate generator multiplies the selected G matrix by the LS estimate streams for each bandwidth sub-section to obtain a set of channel estimations.

8. A device for performing channel estimation in an OFDM system, including:

a non-volatile memory for storing a set of G matrices indexed by signal to noise ratio, the G matrices being precalculated for a plurality of signal to noise ratios using a fixed Doppler frequency and a fixed delay spread, a G matrix selector using a quantised signal to noise ratio to select a G matrix from the set of G matrices stored in the non-volatile memory, a channel estimate generator for multiplying the selected G matrix by LS estimates for the reference signal to obtain a channel estimation, wherein the G matrices stored in the non-volatile memory are indexed by processing mode as well as signal to noise ratio and wherein the G matrix selector uses processing mode as well as quantised signal to noise ratio to select the G matrix used to obtain the channel estimation, a configurable reference signal demultiplexer for processing reference signals received in different processing modes, and a LS estimates demultiplexer for splitting the LS estimates into streams corresponding to sub-sections of the entire bandwidth of the reference signal, wherein the channel estimate generator multiplies the selected G matrix by the LS estimate streams for each bandwidth sub-section to obtain a set of channel estimations.

* * * * *